US012608491B2

(12) United States Patent
    Acharya et al.

(10) Patent No.:  US 12,608,491 B2
(45) **Date of Patent:  \*Apr. 21, 2026**

(54) ACCOUNT REPLICATION INCLUDING SECURITY CONFIGURATIONS

(71) Applicant: Snowflake Inc., Menlo Park, CA (US)

(72) Inventors: Suraj P. Acharya, Newark, CA (US); Damien Carru, Rhinebeck, NY (US); Vikas Jain, Fremont, CA (US); Zhen Mo, Cupertino, CA (US); Frantisek Rolinek, Seattle, WA (US)

(73) Assignee: Snowflake Inc., Menlo Park, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/167,607

(22) Filed: Feb. 10, 2023

(65) Prior Publication Data

US 2023/0185931 A1    Jun. 15, 2023

Related U.S. Application Data

(63) Continuation of application No. 17/898,176, filed on Aug. 29, 2022, now Pat. No. 11,620,395, which is a
(Continued)

(51) Int. Cl.
    *G06F 21/00*        (2013.01)
    *G06F 16/27*        (2019.01)
    (Continued)

(52) U.S. Cl.
    CPC ............ *G06F 21/604* (2013.01); *G06F 16/27* (2019.01); *G06F 21/602* (2013.01); *G06F 21/6218* (2013.01); *G06F 2221/2145* (2013.01)

(58) Field of Classification Search
    None
    See application file for complete search history.

(56) References Cited

U.S. PATENT DOCUMENTS 8,856,077 B1    10/2014  Roth et al.
9,626,527 B2 *    4/2017  Ali ........................ H04L 9/0861
    (Continued)

FOREIGN PATENT DOCUMENTS

CN        1866963        11/2006
CN        101495986        7/2009
    (Continued)

OTHER PUBLICATIONS

"Chinese Application Serial No. 202211529014.3, Request for Reexamination filed Apr. 24, 2024", with English claims, 33 pages.
(Continued)

*Primary Examiner* — Shin-Hon (Eric) Chen
(74) *Attorney, Agent, or Firm* — Schwegman Lundberg & Woessner, P.A.

(57)        ABSTRACT

A request to replicate a first account maintained by a data platform is received. Based on the request, account data associated with the account is accessed. The account data comprises security configurations for the first account. In response to the request, the first account is replicated using the account data. A second account results from replicating the first account. The replicating of the first account comprises automatically replicating the security configurations for the first account to the second account. The replicating of the security configurations comprises replicating an identity management configuration of the first account; replicating an authorization configuration of the first account; and replicating an authentication configuration of the first account.

20 Claims, 9 Drawing Sheets

Related U.S. Application Data continuation of application No. 17/655,887, filed on Mar. 22, 2022, now Pat. No. 11,494,500, which is a continuation of application No. 17/643,642, filed on Dec. 10, 2021, now Pat. No. 11,314,875.

(60) Provisional application No. 63/284,384, filed on Nov. 30, 2021.

(51) Int. Cl.
  *G06F 21/60*      (2013.01)
  *G06F 21/62*      (2013.01)

(56)                References Cited

U.S. PATENT DOCUMENTS

| | | | | |
|---|---|---|---|---|
| 10,462,009 | B1 | 10/2019 | Shiramshetti | |
| 10,824,640 | B1 | 11/2020 | Chen et al. | |
| 10,861,006 | B1 * | 12/2020 | Ilincic | G06Q 20/341 |
| 10,880,159 | B1 * | 12/2020 | Khoo | H04L 41/0803 |
| 11,138,340 | B1 * | 10/2021 | Blum | G06F 16/27 |
| 11,169,835 | B1 * | 11/2021 | Duong | G06F 9/4856 |
| 11,314,875 | B1 * | 4/2022 | Acharya | G06F 21/602 |
| 11,372,991 | B1 * | 6/2022 | Willett | G06F 21/6218 |
| 11,422,652 | B2 * | 8/2022 | Pak | G06F 3/0412 |
| 11,494,500 | B1 | 11/2022 | Acharya et al. | |
| 11,620,276 | B1 | 4/2023 | Arikatla et al. | |
| 11,620,395 | B1 | 4/2023 | Acharya et al. | |
| 12,314,248 | B2 | 5/2025 | Arikatla et al. | |
| 2013/0339295 | A1 * | 12/2013 | Dean | G06F 3/0617 |
| | | | | 707/610 |
| 2016/0350747 | A1 * | 12/2016 | Pruthi | G06Q 20/108 |
| 2019/0327242 | A1 * | 10/2019 | Anderson | H04L 63/083 |
| 2020/0012473 | A1 * | 1/2020 | Thoresz | G06F 3/165 |
| 2020/0159624 | A1 * | 5/2020 | Malkov | G06N 20/00 |
| 2020/0257700 | A1 * | 8/2020 | Xu | G06F 16/213 |
| 2021/0303164 | A1 * | 9/2021 | Grunwald | G06F 16/1734 |
| 2021/0318998 | A1 | 10/2021 | Filip et al. | |
| 2021/0390170 | A1 * | 12/2021 | Olden | H04L 63/08 |
| 2022/0027051 | A1 * | 1/2022 | Kant | G06F 3/0617 |
| 2022/0043585 | A1 * | 2/2022 | Senyuk | G06F 16/27 |
| 2022/0198031 | A1 * | 6/2022 | Yuan | G06F 21/6209 |
| 2022/0200804 | A1 * | 6/2022 | Long | H04L 63/0428 |
| 2023/0033078 | A1 * | 2/2023 | Tang | G06F 16/9577 |
| 2023/0350873 | A1 | 11/2023 | Arikatla et al. | |
| 2024/0095232 | A1 | 3/2024 | Arikatla et al. | |

FOREIGN PATENT DOCUMENTS

| | | |
|---|---|---|
| CN | 104954358 | 9/2015 |
| CN | 110334489 | 10/2019 |
| CN | 116204580 | 6/2023 |

OTHER PUBLICATIONS

"U.S. Appl. No. 18/521,790, Non Final Office Action mailed Oct. 1, 2024", 15 pages.

"Chinese Application Serial No. 202211529014.3, Voluntary Amendment filed May 25, 2023", with English claims, 18.

"European Application Serial No. 22210591.8, Extended European Search Report mailed Apr. 25, 2023", 8 pgs.

U.S. Appl. No. 18/521,790, filed Nov. 28, 2023, Background Job Based Refresh Fulfillment.

"U.S. Appl. No. 17/643,642, Notice of Allowance mailed Mar. 2, 2022", 12 pgs.

"U.S. Appl. No. 17/655,887, Notice of Allowance mailed Jun. 23, 2022", 20 pgs.

"U.S. Appl. No. 17/898,176, Notice of Allowance mailed Nov. 30, 2022", 22 pgs.

Bilal, et al., "Evaluation of Secure OpenID-Based RAAA User Authentication Protocol for Preventing Specific Web Attacks in Web Apps", IEEE, (2020).

Iqbal, et al., "Service delivery models of cloud computing: security issues and open challenges", John Wiley & Sons, (2016).

Lim, et al., "Blockchain technology the identity management and authentication service disruptor.", IJAEIT, (2018).

Singh, et al., "Identity Management in Cloud computing Through Claim-Based Solution", IEEE, (2015).

"Chinese Application Serial No. 202211529014.3, Office Action mailed Jul. 30, 2023", with machine English translation, 17 pages.

"U.S. Appl. No. 17/661,431, Non Final Office Action mailed Aug. 12, 2022", 15 pgs.

"U.S. Appl. No. 17/661,431, Response filed Nov. 11, 2022 to Non Final Office Action mailed Aug. 12, 2022", 13 pgs.

"U.S. Appl. No. 17/661,431, Notice of Allowance mailed Dec. 29, 2022", 5 pgs.

"U.S. Appl. No. 18/104,095, Preliminary Amendment filed Feb. 2, 2023", 10 pgs.

"U.S. Appl. No. 18/104,095, Non Final Office Action mailed May 24, 2023", 11 pgs.

"U.S. Appl. No. 18/104,095, Response filed Aug. 24, 2023 to Non Final Office Action mailed May 24, 2023", 3 pgs.

"U.S. Appl. No. 18/104,095, Notice of Allowance mailed Sep. 28, 2023", 5 pgs.

"Chinese Application Serial No. 202211529014.3, Response filed Oct. 25, 2023 to Office Action mailed Jul. 30, 2023", with English claims, 33 pages.

"Chinese Application Serial No. 202211529014.3, Office Action mailed Nov. 11, 2023", with English translation, 19 pages.

"European Application Serial No. 22210591.8, Response filed Nov. 23, 2023 to Extended European Search Report mailed Apr. 25, 2023", 16 pgs.

"Chinese Application Serial No. 202211529014.3, Response filed Jan. 4, 2024 to Office Action mailed Nov. 11, 2023", with English claims, 33 pages.

"Chinese Application Serial No. 202211529014.3, Decision of Rejection mailed Jan. 28, 2024", with machine English translation, 18 pages.

"U.S. Appl. No. 18/521,790, Notice of Allowance mailed Feb. 7, 2025", 5 pgs.

"U.S. Appl. No. 18/521,790, Response filed Dec. 20, 2024 to Non Final Office Action mailed Oct. 1, 2024", 11 pgs.

* cited by examiner

410

C

B

DEPLOYMENT

A

DEPLOYMENT

GROUP

D

E

420

D ← C

B ← A

DEPLOYMENT          DEPLOYMENT

GROUP

430

B

C          A

DEPLOYMENT

D

DEPLOYMENT

GROUP

605   REPLICATE PROVISIONER ROLE

610   REPLICATE INTEGRATION OBJECT

615   CONNECT PROVISIONER ROLE TO REPLICATED INTEGRATION OBJECT

525

620   MODIFY ACCESS TOKEN STRING STRUCTURE

625   MODIFY ACCESS TOKEN DATA STRUCTURE

630   REPLICATE TOKEN ENCRYPTION KEY(S)

635   MODIFY USER IDENTIFIER ASSOCIATED WITH ACCESS TOKEN

ACCOUNT REPLICATION INCLUDING SECURITY CONFIGURATIONS

PRIORITY CLAIM

This application is a continuation of U.S. patent application Ser. No. 17/898,176, filed Aug. 29, 2022, which is a continuation of U.S. patent application Ser. No. 17/655,887, filed Mar. 22, 2022 and now issued as U.S. Pat. No. 11,494,500, which is a continuation of U.S. patent application Ser. No. 17/643,642, filed Dec. 10, 2021 and now issued as U.S. Pat. No. 11,314,875, which claims priority to U.S. Provisional Patent Application No. 63/284,384 filed on Nov. 30, 2021, the contents of which are incorporated herein by reference in their entireties.

TECHNICAL FIELD

Embodiments of the disclosure relate generally to databases and, more specifically, to replication of account security features for a multiple deployment database.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like. A given table may be organized as records (e.g., rows) that each include one or more attributes (e.g., columns). A data platform may physically store database data in multiple storage units, which may be referred to as blocks, micro-partitions, and/or by one or more other names.

BRIEF DESCRIPTION OF THE DRAWINGS

The present disclosure will be understood more fully from the detailed description given below and from the accompanying drawings of various embodiments of the disclosure.

FIG. 4 is a conceptual diagram illustrating various customer account replication groups, in accordance with some embodiments of the present disclosure.

DETAILED DESCRIPTION

Figure 1:
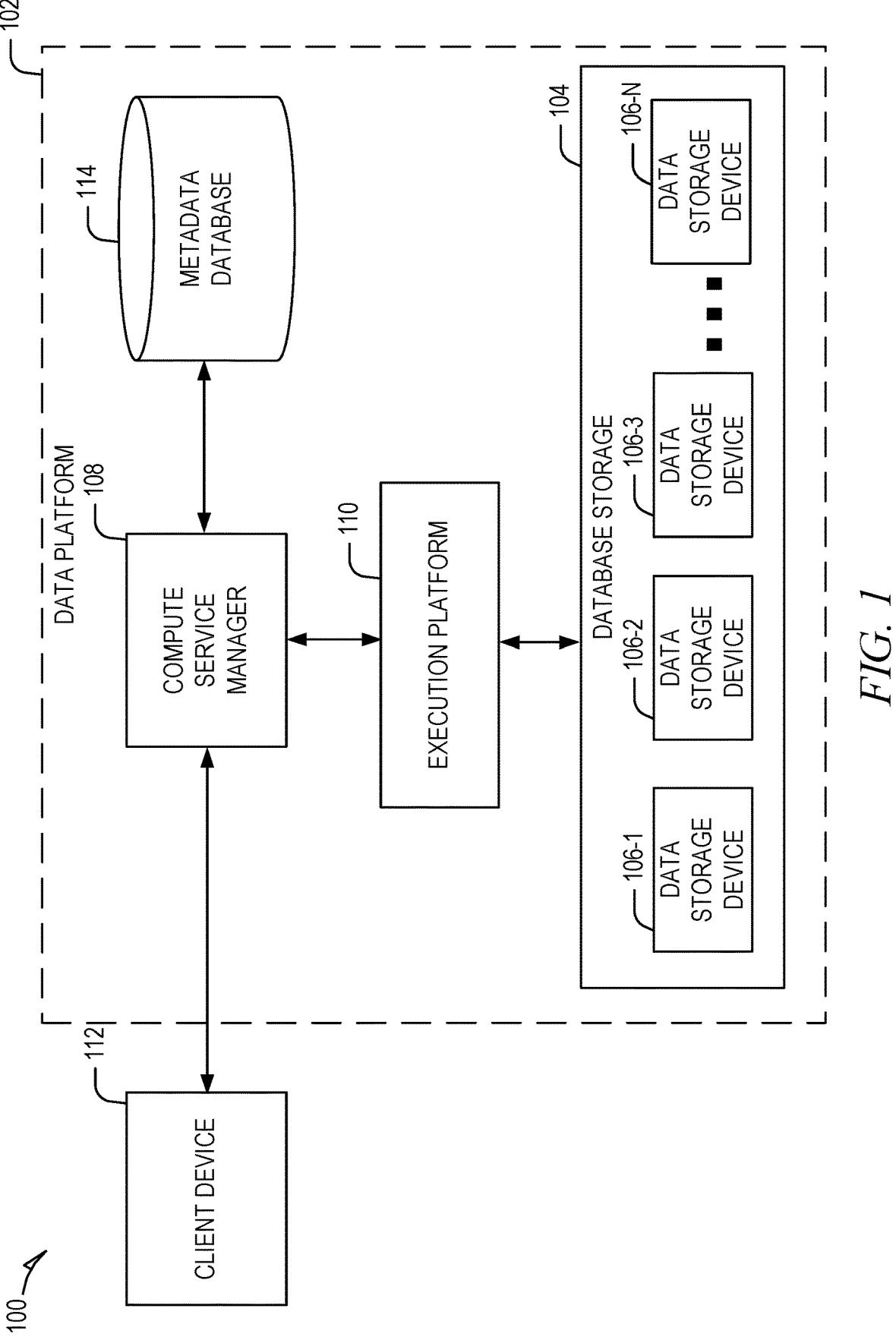
FIG. 1 illustrates an example computing environment that includes a network-based data platform in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In some instances, it may be beneficial to replicate database data across multiple geographic locations, across multiple database vendors or providers, and/or across multiple computing devices that may be located in the same physical location or in two or more different locations. These multiple locations, vendors, providers, and/or computing devices may be referred to herein as "deployments." This may provide significant benefits to a database client because the data is backed up in more than one location. In the event that one deployment is unavailable due to, for example, a power outage, a system error, a scheduled maintenance downtime, and so forth, a failover process ensures a different deployment takes over the management and operation of the database.

In conventional data platforms, customer accounts can be replicated across multiple deployments. For a typical database with multiple deployments, account administrators must manually manage account security configurations to keep them in-sync across primary and secondary accounts used for the failover. Further, end users must manually re-configure security configurations and re-authenticate all security tokens when an account is replicated.

Aspects of the present disclosure include systems, methods, and devices to address, among other problems, the aforementioned shortcomings of account replication with conventional data platforms by using an approach to account replication that involves automatically replicating security configurations from a primary account to a replicated account (also referred to herein as a "secondary account"). With this approach to account replication, any configuration changes made to the primary account are also automatically replicated, thereby eliminating the need for account administrators to manually manage the security configurations in primary and secondary accounts to keep them in-sync. Also, end users connecting to the data platform can continue to seamlessly work when failover happens from primary to the secondary account.

When replicating from a primary account to a secondary account in accordance with the approach described herein, all existing security configurations are seamlessly replicated. Meanwhile, all long-lived tokens generated by the primary account can be validated by the secondary account. Thus, even if a failover or a recovery happens, end users are not impacted.

In example embodiments, a data platform receives a request to replicate a primary account to a secondary account. Based on the request, the data platform accesses account data of the primary account. The account data can include account-level objects such as users, roles, and the like, as well as one or more security configurations. The security configurations can include: an identity management configuration that defines user and role provisioning features for the primary account such as a System for Cross-Domain Identity Management (SCIM) configuration; an authorization configuration that defines resource access authorizations for the primary account such as an Open Authorization (OAuth) configuration; and an authentication configuration that defines access credential authentication features for the primary account such as a Security Assertion Markup Language (SAML) Single Sign-On (SSO) configuration. The data platform uses the account data to replicate the primary account, which results in the secondary account.

When replicating the primary account, the data platform automatically replicates the security configurations of the primary account to the secondary account. In replicating the security configurations, the data platform replicates the identity management configuration and configures an access token associated with the identity management configuration for validation by the secondary account. The data platform also replicates the authorization configuration and configures a refresh token associated with the authorization configuration for validation by the secondary account. In addition, the data platform automatically replicates the authentication configuration to the secondary account.

This approach to account replication supports complicated replication/failover scenarios. For example, suppose there are multiple accounts in a replication group that form a complicated replication topology such as a chain, a star, or even a loop. All tokens and security configurations generated during the replication/failover process are maintained. A security token generation process may involve multiple objects from an account, such as a user, a security integration, a key, a role, and the like. The account replication approach described herein can make use of the objects replicated from different accounts to generate security tokens, and these tokens are still valid after subsequent replications.

FIG. 1 illustrates an example computing environment 100 that includes a data platform 102 in communication with a client device 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a database storage 104, a compute service manager 108, an execution platform 110, and a metadata database 114. The database storage 104 comprises a plurality of computing machines and provides on-demand computer system resources such as data storage and computing power to the data platform 102. As shown, the database storage 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the database storage 104 may include distributed file systems (e.g., Hadoop Distributed File Systems (HDFS)), object storage systems, and the like.

The data platform 102 is used for reporting and analysis of integrated data from one or more disparate sources including the storage devices 106-1 to 106-N within the database storage 104. The data platform 102 hosts and provides data reporting and analysis services to multiple customer accounts. Administrative users can create and manage identities (e.g., users, roles, and groups) and use permissions to allow or deny access to the identities to resources and services. Generally, the data platform 102 maintains numerous customer accounts for numerous respective customers. The data platform 102 maintains each customer account in one or more storage devices of the database storage 104. Moreover, the data platform 102 may maintain metadata associated with the customer accounts in the metadata database 114. Each customer account includes multiple data objects with examples including users, roles, permissions, stages, and the like.

The compute service manager 108 coordinates and manages operations of the data platform 102. The compute service manager 108 also performs query optimization and compilation as well as managing clusters of compute services that provide compute resources (also referred to as "virtual warehouses"). The compute service manager 108 can support any number and type of clients such as end users providing data storage and retrieval requests, system administrators managing the systems and methods described herein, and other components/devices that interact with compute service manager 108. As an example, the compute service manager 108 is in communication with the client device 112. The client device 112 can be used by a user of one of the multiple customer accounts supported by the data platform 102 to interact with and utilize the functionality of the data platform 102. In some embodiments, the compute service manager 108 does not receive any direct communications from the client device 112 and only receives communications concerning jobs from a queue within the data platform 102.

The compute service manager 108 is also coupled to metadata database 114. The metadata database 114 stores data pertaining to various functions and aspects associated with the data platform 102 and its users. In some embodiments, the metadata database 114 includes a summary of data stored in remote data storage systems as well as data available from a local cache. Additionally, the metadata database 114 may include information regarding how data is organized in remote data storage systems (e.g., the database storage 104) and the local caches. The metadata database 114 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to the database storage 104. The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, metadata database 114, execution platform 110, and database storage 104 are shown in FIG. 1 as individual discrete components. However, each of the compute service manager 108, metadata database 114, execution platform 110, and database storage 104 may be implemented as a distributed system (e.g., distributed across multiple systems/platforms at multiple geographic locations). Additionally, each of the compute service manager 108, metadata database 114, execution platform 110, and database storage 104 can be scaled up or down (independently of one another) depending on changes to the requests received and the changing needs of the data platform 102. Thus, in the described embodiments, the data platform 102 is dynamic and supports regular changes to meet the current data processing needs.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the database storage 104. It is desirable to retrieve as much data as possible from caches within the execution platform 110 because the retrieval speed is typically much faster than retrieving data from the database storage 104.

As shown in FIG. 1, the computing environment 100 separates the execution platform 110 from the database storage 104. In this arrangement, the processing resources and cache resources in the execution platform 110 operate independently of the data storage devices 106-1 to 106-N in the database storage 104. Thus, the computing resources and cache resources are not restricted to specific data storage devices 106-1 to 106-N. Instead, all computing resources and all cache resources may retrieve data from, and store data to, any of the data storage resources in the database storage 104.

Figure 2:
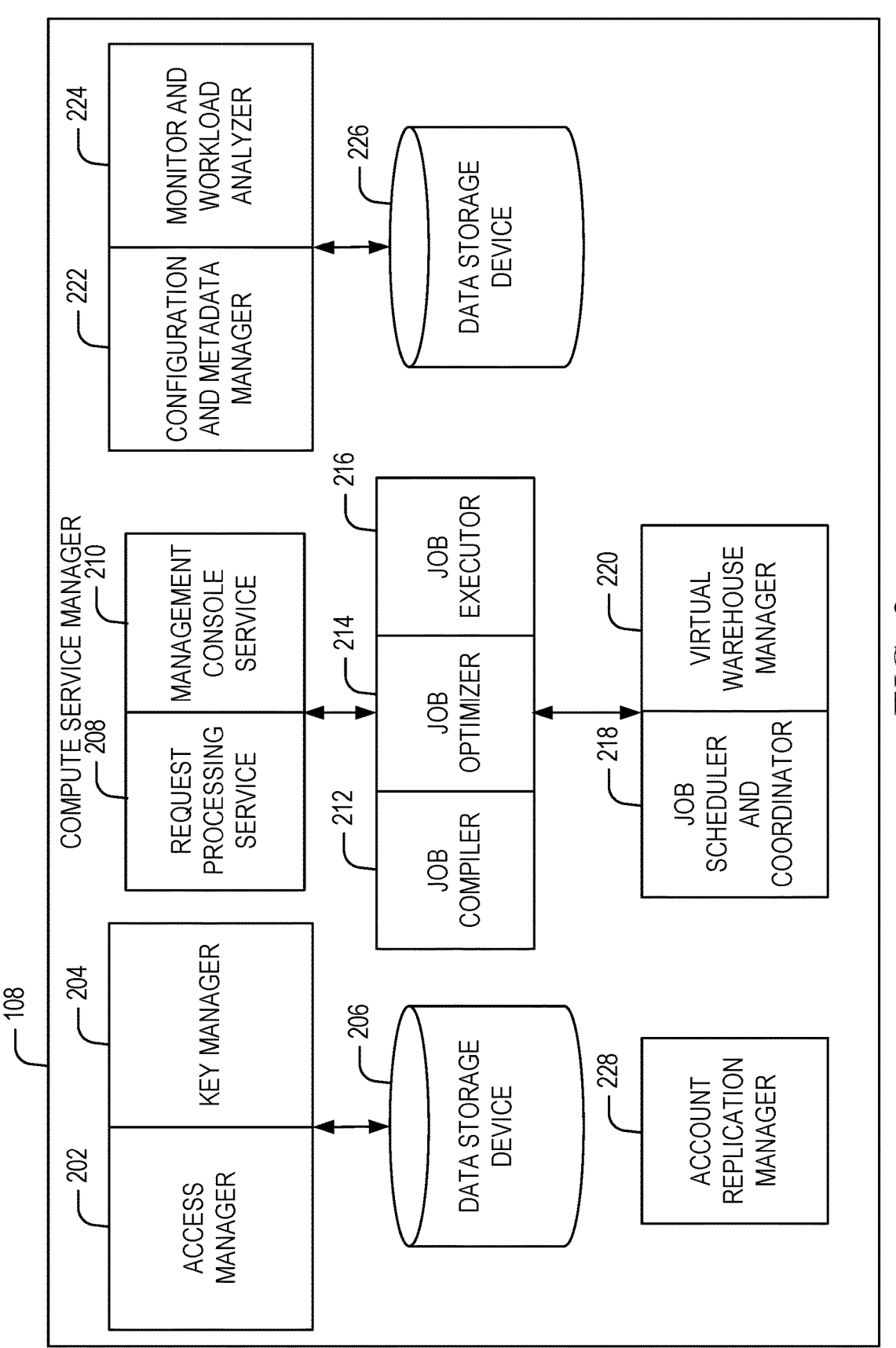
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in database storage 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in database storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in database storage 104, or any other storage device.

As shown, the compute service manager 108 further includes an account replication manager 228. The account replication manager 228 is responsible for handling account replication including automatic replication of security features. Further details regarding the generation of pruning indexes are discussed below.

Figure 3:
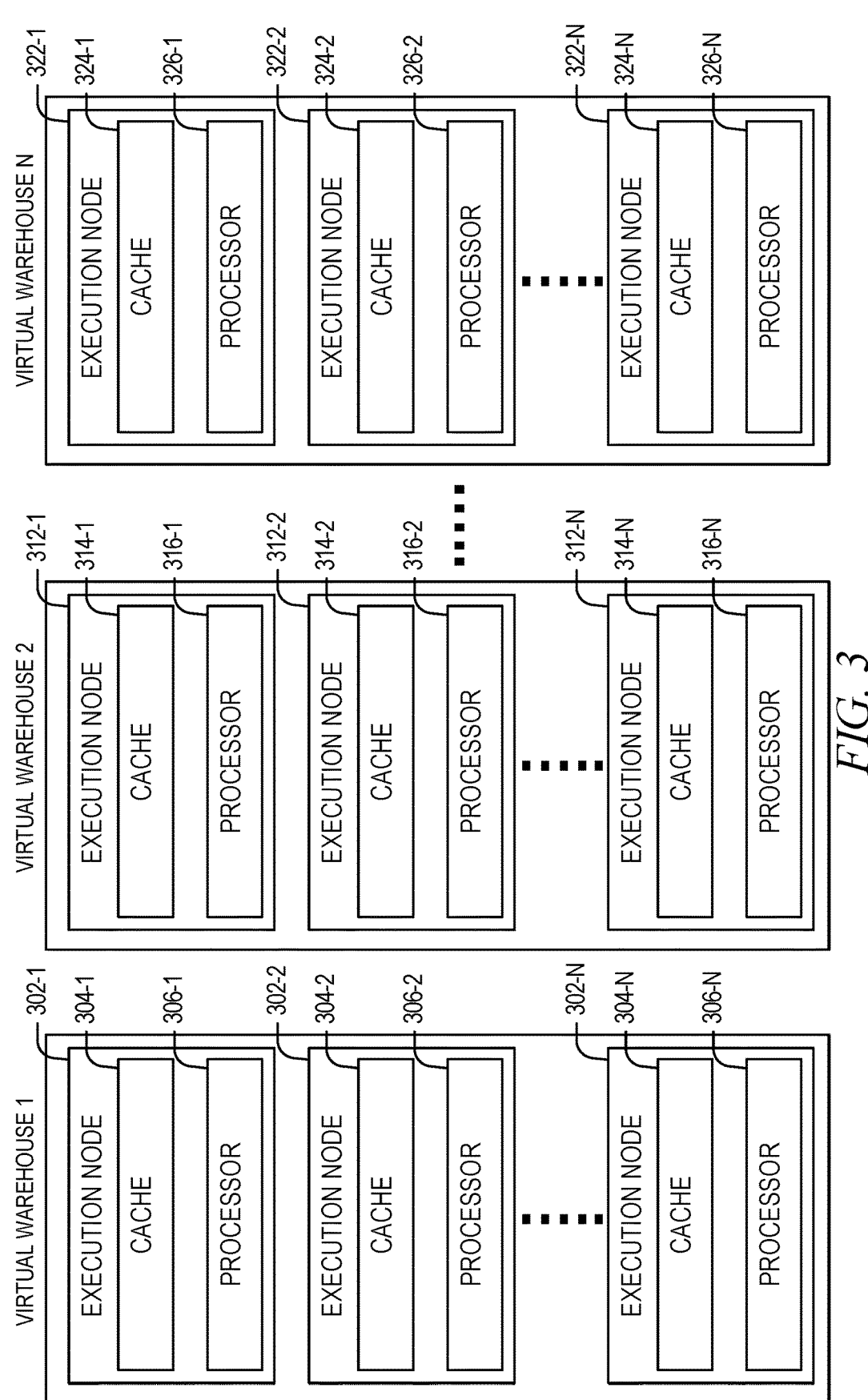
FIG. 3 is a block diagram illustrating components of an execution platform, in accordance with some embodiments of the present disclosure.
Figure 5:
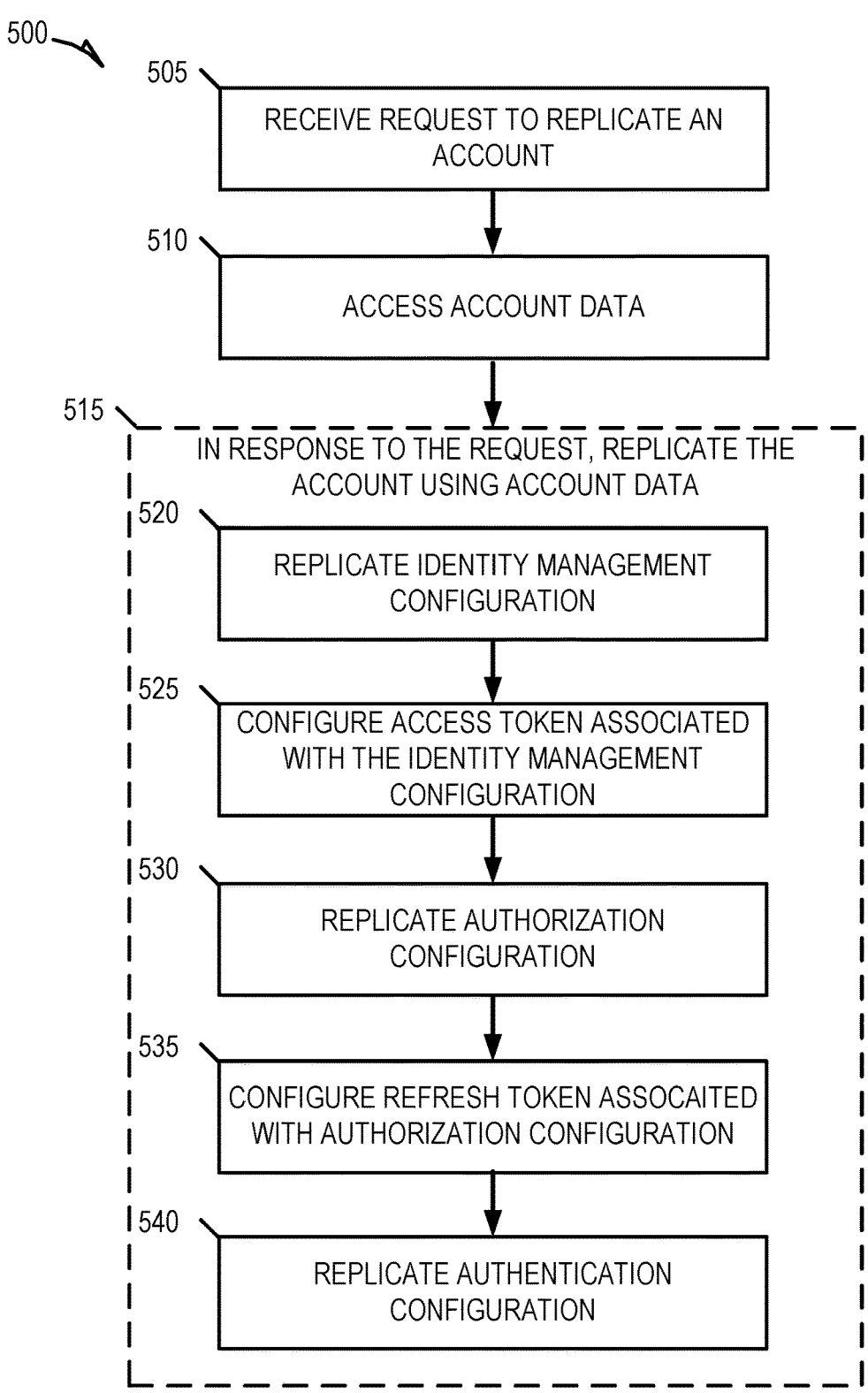
FIGS. 5-8 are flow diagrams illustrating operations of the network-based data platform in performing a method for customer account replication, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in database storage 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the database storage 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in database storage 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the database storage 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in database storage 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
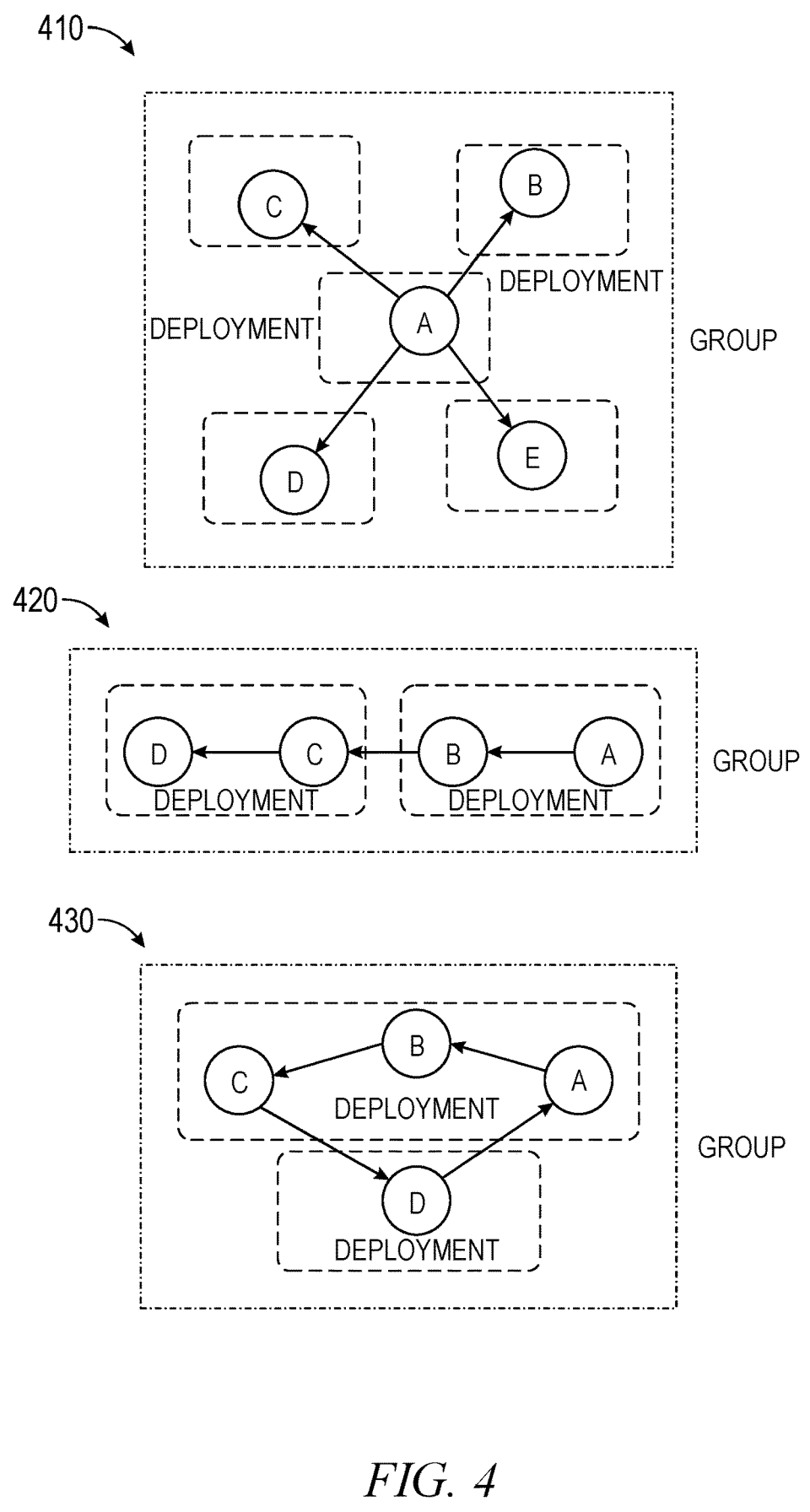

FIG. 4 is a conceptual diagram illustrating various customer account replication groups, in accordance with some embodiments of the present disclosure. A replication group refers to a group of customer accounts that includes a primary account and one or more secondary accounts that are produced by replicating the primary account. In the context of a replication group, a secondary account can, in some instances, become the primary account for the replication group with which the customer communicates. The data platform 102 can use a replication group identifier to identify accounts that are part of the same replication group.

As noted above, each customer account includes multiple data objects with examples including users, roles, permissions, stages, and the like. Additionally, a customer account may include one or more security configurations. The one or more security configurations can include an identity management (e.g., SCIM) configuration, an authorization (e.g., OAuth) configuration, and an authentication (e.g., SAML SSO) configuration, among others. Each security configuration can include one or more integrations, which are objects that provide an interface between the data platform 102 and a third-party service. For example, a customer account may include: a first integration object that provides an interface with a third-party identity management service (e.g., SCIM); a second integration object that provides an interface with a third-party authorization service (e.g., OAuth); and a third integration that provides an interface with a third-party authentication service (e.g., SAML SSO).

An account can be replicated from one deployment to another deployment or within the same deployment. In addition, as shown in FIG. 4, multiple accounts in the same replication group can be replicated to/from each other and therefore create various topologies such as a star 410, a chain 420, or a loop 430. Regardless of the topology, the data platform 102 replicates accounts such that all security configurations are inherited from its ancestor accounts and all long-lived security tokens generated by ancestor accounts can be validated by the replicated account.

FIGS. 5-8 are flow diagrams illustrating operations of the network-based data platform 102 in performing a method 500 for customer account replication, in accordance with some embodiments of the present disclosure. The method 500 may be embodied in computer-readable instructions for execution by one or more hardware components (e.g., one or more processors) such that the operations of the method 500 may be performed by components of data platform 102. Accordingly, the method 500 is described below, by way of example with reference thereto. However, it shall be appreciated that method 500 may be deployed on various other hardware configurations and is not intended to be limited to deployment within the data platform 102.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel or performing sets of operations in separate processes.

At operation 505, the compute service manager 108 receives a request to replicate an account maintained by the data platform 102 (hereinafter referred to as a "primary account"). The request can be received from client device 112 or from a programmatic client of the data platform 102.

At operation 510, the compute service manager 108 accesses account data associated with the primary account from a database (e.g., metadata database 114 and/or a database maintained in the database storage 104). The account data describes various aspects of the primary account. The account data can include account-level objects such as users, roles, and the like, as well as one or more security configurations. The security configurations for the primary account can include an identity management configuration (e.g., a SCIM configuration), an authorization configuration (e.g., an OAuth configuration), and an authentication configuration (e.g., a SAML SSO configuration). Each security configuration can include one or more integration objects to provide an interface with a corresponding third-party service, as noted above.

In response to the request, the compute service manager 108 replicates the primary account using the account data, at operation 515. In replicating the primary account, the compute service manager 108 generates a secondary account (also referred to herein as a "replicated account"). In replicating the primary account to the secondary account, the compute service manager 108 automatically replicates the security configurations of the primary account to the secondary account. As shown, the operations 520, 525, 530, 535, and 540 can be performed as part of replicating the account and specifically as part of replicating the security configurations of the primary account.

At operation 520, the compute service manager 108 replicates an identity management configuration (e.g., a SCIM configuration) of the primary account. At operation 525, the compute service manager 108 configures an access token associated with the identity management configuration so that the access token can be validated by the secondary account. Further details regarding operations 520 and 525 are discussed below in reference to FIG. 6.

At operation 530, the compute service manager 108 replicates an authorization configuration (e.g., an OAuth configuration) of the account. At operation 535, the compute service manager 108 configures a refresh token associated with the authorization configuration so that the access token can be validated by the secondary account. Further details regarding operations 530 and 535 are discussed below in reference to FIG. 7.

At operation 540, the compute service manager 108 replicates an authentication configuration of the account (e.g., a SAML SSO configuration). Further details regarding operation 540 are discussed below in reference to FIG. 8.

Figure 6:
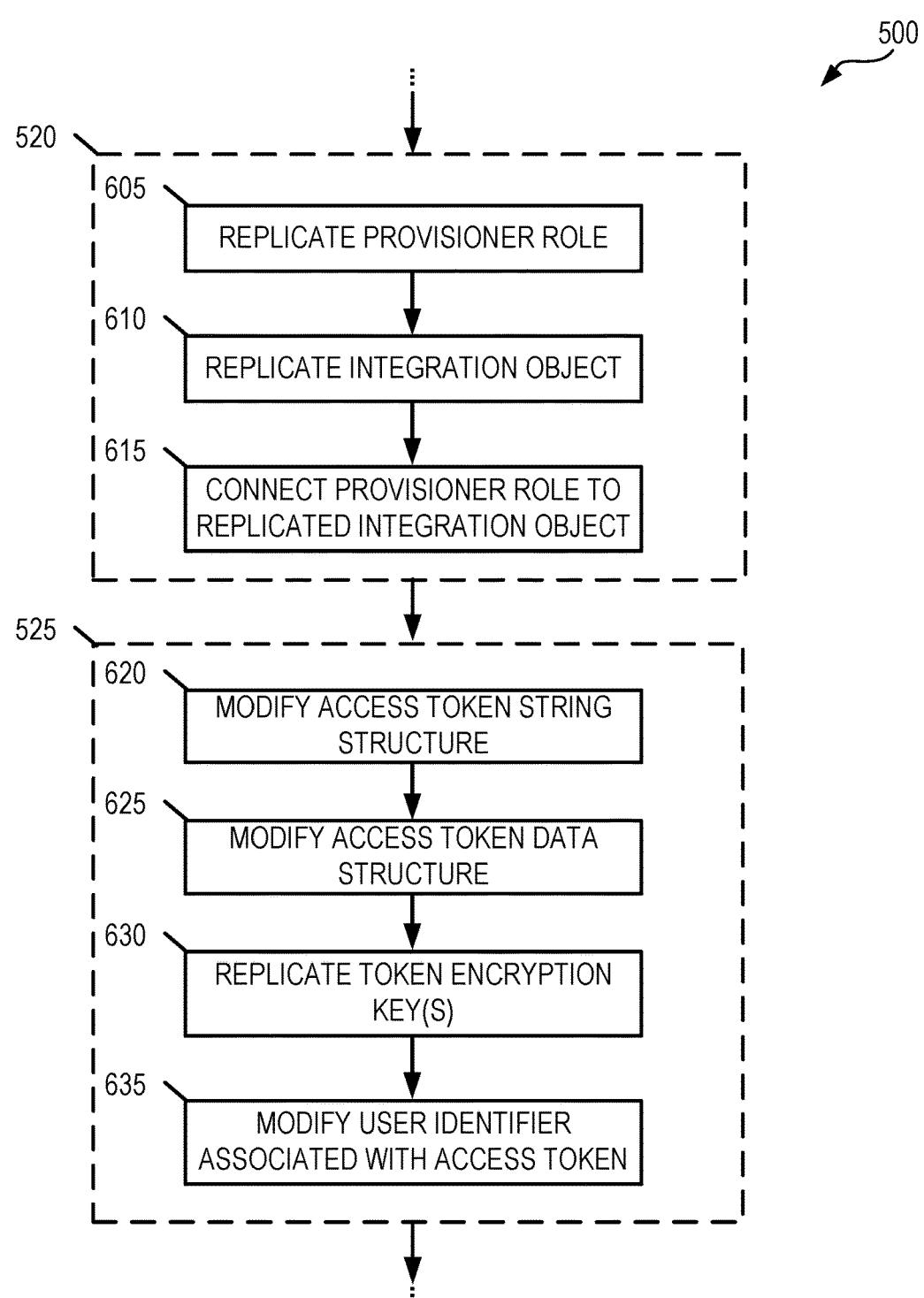

As shown in FIG. 6, the method 500 can include operations 605, 610, 615, 620, 625, and 630. The operations 605, 610, and 615 can be performed as part of operation 520 where the compute service manager 108 replicates the identity management configuration of the account. At operation 605, the compute service manager 108 replicates a provisioner role of the identity management configuration along with its permissions. As a result, a replicated provisioner role is produced. The provisioner role for the primary account has associated permissions to grant new users and roles in the primary account. The replicated provisional role for the secondary account has associated permissions to grant new users and roles in the secondary account. The replicating of the provisioner role from the primary account results in creation of a replicated provisioner role.

At operation 610, the compute service manager 108 replicates an integration object associated with the identity management configuration (hereinafter referred to also as a "primary integration object"). The primary integration object associated with the identity management configuration provides an interface between the data platform 102 and a third-party identity management service that corresponds to the identity management configuration of the primary account. In replicating the primary integration object, the compute service manager 108 generates a secondary integration object (also referred to as a "replicated integration object").

The primary integration object includes a field that identifies a role in the primary account used to execute the integration with the third-party identity management service. When the secondary integration object is initially created through replication of the primary integration object, the field is empty. Accordingly, at operation 615, the compute service manager 108 connects the replicated provisioner role to the replicated integration object. In doing so, the compute service manager 108 may remap an identifier of the replicated provisioner role to the replicated integration object.

As shown, the operations 620, 625, 630, and 635 can be performed as part of operation 525 where the compute service manager 108 configures the access token associated with the identity management configuration for use by the secondary account. At operation 620, the compute service manager 108 modifies a string structure of the access token. In modifying the string structure, the compute service manager 108 performs a number of operations including: changing a schema version number; adding a new deployment identifier that is outside of an encryption string portion of the string; adding integration issuing information that includes the deployment identifier and an integration source identifier; and adding a replication group identifier in the encryption string portion.

At operation 625, the compute service manager 108 modifies a data structure of the access token. The compute service manager 108 modifies the data structure to include a global identifier. The global identifier comprises a combination of a deployment identifier and an entity identifier. The deployment identifier identifies the deployment for the primary account, and the entity identifier identifies a customer entity that corresponds to the primary account. In addition, the compute service manager 108 may further modify the data structure by adding an organization name into the attributes of the data structure and add an identifier of an issuing deployment and version.

At operation 630, the compute service manager 108 replicates one or more token encryption keys used to encrypt the access token. The one or more replicated token encryption keys may be stored in a data object that includes metadata associated with the secondary account. In some instances, the compute service manager 108 can perform key cleaning or removal so as not to store keys in the secondary account indefinitely. In performing a cleaning operation on a key, the compute service manager 108 may remove a key from the data object associated with the account (primary or secondary) and add the key to a list of expired keys that is used by a key expiration service to delete expired keys. The compute service manager 108 may perform a key cleaning, for example, when: a customer suspends a replication of a first account to a second account; when a customer disables replication of a replication group from a first account to a second account by removing the second account from an allowed list; or when a customer disables a failover group from a first account to a second account by removing the second account from the allowed list.

At operation 635, the compute service manager 108 modifies a format of a user identifier associated with the access token. Initially, a user identifier is generated when a new user is provisioned. The user identifier comprises an account identifier, a local entity identifier, and a 2-bit flag. In modifying the identifier format, the compute service manager 108 changes the local entity identifier to the global identifier discussed above.

Figure 7:
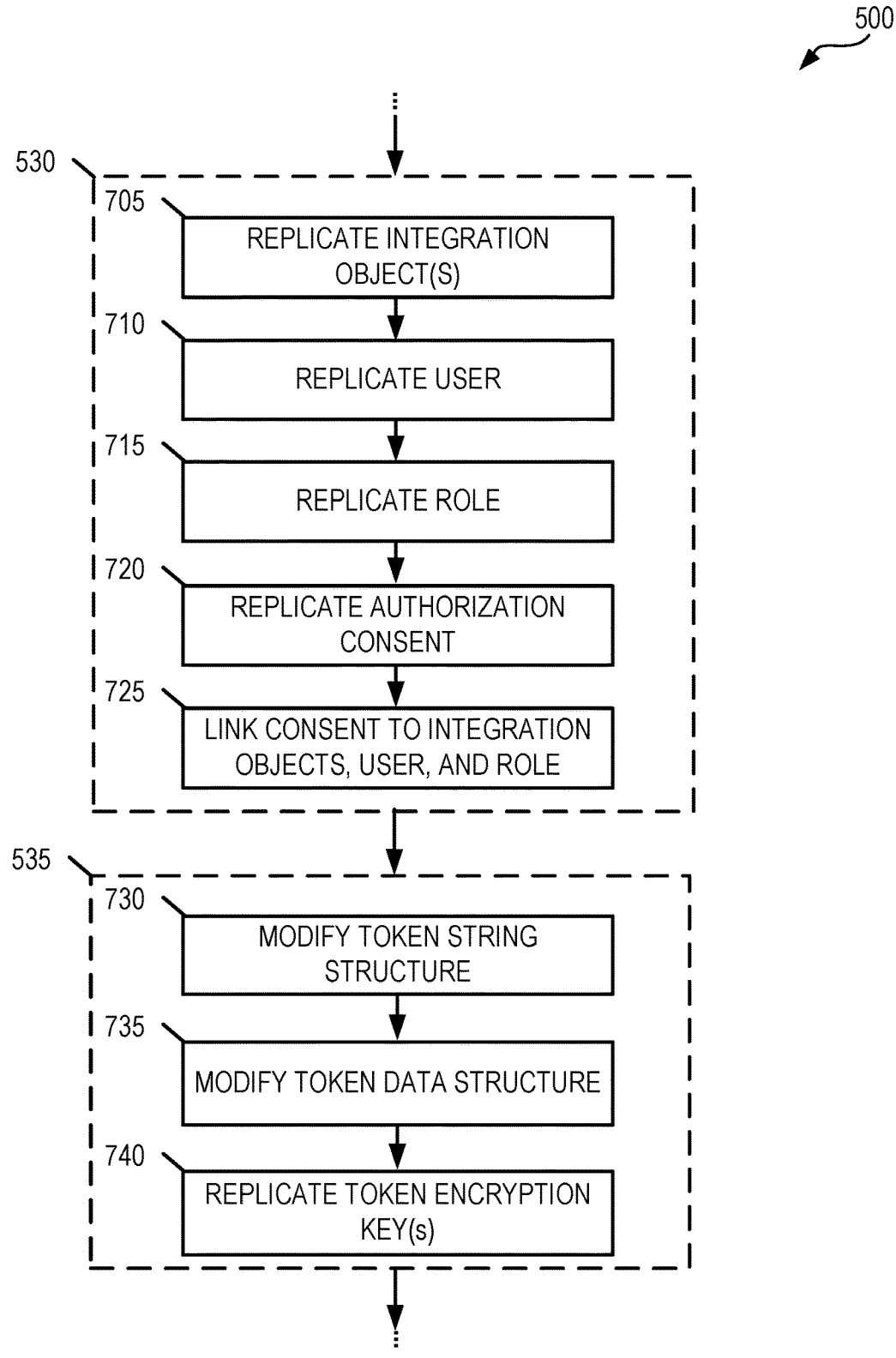

As shown in FIG. 7, the method 500 can include operations 705, 710, 715, 720, 725, 730, 735, and 740. The operations 705, 710, 715, 720, 725, and 730 can be performed as part of the operation 530 where the compute service manager 108 replicates the authentication configuration of the account. At operation 705, the compute service manager 108 replicates one or more integration objects associated with the authorization configuration. Each such integration object provides an interface between the data platform 102 and a third-party authorization service (e.g., OAuth) that corresponds to the authorization configuration. The compute service manager 108 can replicate a system (internal) integration object, a client (external) integration object, or both depending on the circumstances. In instances in which both the system and client integration object are replicated, the compute service manager 108 replicates both integration objects to include the same client identifier and client secret.

The compute service manager 108 further replicates a user associated with the authorization configuration (operation 710), a role associated with the authorization configuration (operation 715), and an authorization consent of the authorization configuration (operation 720). The authorization consent corresponds to a stored indication that the user consents to use of the role in a session. At operation 725, the compute service manager 108 links the authorization consent to the integration objects, the user, and the role.

The operations 730, 735, and 740 can be performed as part of operation 535 where the compute service manager 108 configures the refresh token associated with the authorization configuration for use with the secondary account. At operation 730, the compute service manager 108 modifies a token string structure of the refresh token. In modifying the token string structure, the compute service manager 108 may perform one or more of: changing a version number, adding a deployment identifier corresponding to the deployment from where the fresh token is generated; adding the global identifier into an encrypted string portion; and adding a replication group identifier into the encrypted string portion.

At operation 735, the compute service manager 108 modifies a data structure of the refresh token. The compute service manager 108 modifies the data structure to include the global identifier mentioned above. At operation 740, the compute service manager 108 replicates one or more token encryption keys used to encrypt the refresh token.

Figure 8:
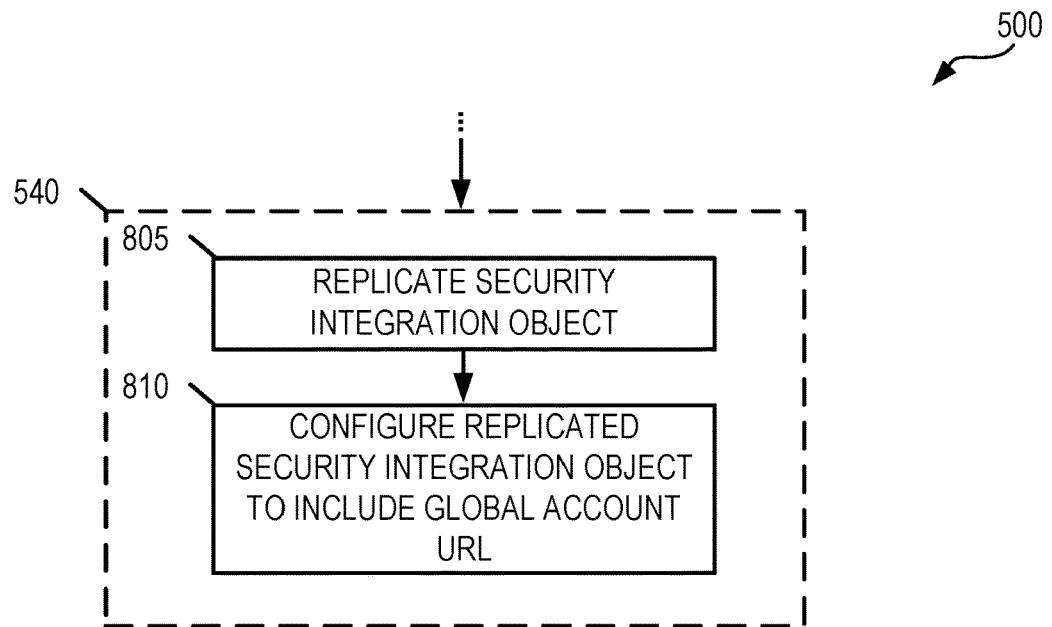

As shown in FIG. 8, the method 500 can, in some embodiments, include operations 805 and 810. Consistent with these embodiments, the operations 805 and 810 can be performed as part of the operation 540 where the compute service manager 108 replicates the authorization configuration.

At operation 805, the compute service manager 108 replicates an integration object associated with the authorization configuration. The integration object provides an interface between the data platform 102 and a third-party authorization service corresponding to the authorization configuration. In replicating the security integration object, the compute service manager 108 generates a replicated security integration object. At operation 810, the compute service manager 108 configures the new security integration object to include a global account URL. The global account URL corresponds to account resources (e.g., dashboards and other user interfaces) that can be utilized within the replication group. The inclusion of the global account URL in the integration object allows account users to continue to seamlessly access such resources upon a failover to the secondary account.

Described implementations of the subject matter can include one or more features, alone or in combination as illustrated below by way of example.

Example 1 is a method comprising: receiving a request to replicate a first account maintained by a data platform; accessing, based on the request, account data associated with the first account, the account data comprising security configurations for the first account; and in response to the request, replicating, by one or more hardware processors, the first account using the account data, the replicating of the first account resulting in a second account, the replicating of the first account comprising automatically replicating the security configurations for the first account to the second account, the replicating of the security configurations comprising: replicating an identity management configuration of the first account to the second account; replicating an authorization configuration of the first account to the second account; and replicating an authentication configuration of the first account to the second account.

Example 2 includes the method of Example 1, wherein the replicating of the security configurations further comprises configuring an access token associated with the identity management configuration for validation by the second account.

Example 3 includes the method of any one or more of Examples 1 or 2, wherein configuring the access token associated with the identity management configuration comprises modifying a data structure of the access token to include a global identifier.

Example 4 includes the method of any one or more of Examples 1-3, wherein the configuring of the access token further comprises: modifying a string structure of the access token to include a replication group identifier, the replication group identifier identifying a group of accounts, the group of accounts including the first account and the second account; replicating a token encryption key used to encrypt the access token; and modifying an identifier format associated with the access token to include the global identifier.

Example 5 includes the method of any one or more of Examples 1-4, wherein the global identifier comprises a combination of a deployment identifier and an entity identifier, the deployment identifier identifying a deployment of the first account, the entity identifier identifying a customer entity corresponding to the first account.

Example 6 includes the method of any one or more of Examples 1-5, wherein the replicating of the identity management configuration comprises: replicating a provisioner role in the identity management configuration, the provisioner role having associated permissions to provision new users and roles within the first account, the replicating of the provisioner role resulting in a replicated provisioner role having associated permissions to provision new users and roles within the second account; replicating an integration object associated with the identity management configuration, the integration object providing an interface between the data platform and an identity management service corresponding to the identity management configuration; and connecting the provisioner role with the integration object.

Example 7 includes the method of any one or more of Examples 1-6, wherein the replicating of the security configurations further comprises configuring a refresh token associated with the authorization configuration for validation by the second account.

Example 8 includes the method of any one or more of Examples 1-7, wherein configuring of the refresh token comprises modifying a data structure of the refresh token to include a global identifier, the global identifier comprising a combination of a deployment identifier and an entity identifier, the deployment identifier identifying a deployment of the first account, the entity identifier identifying a customer entity corresponding to the first account.

Example 9 includes the method of any one or more of Examples 1-8, wherein the configuring of the refresh token further comprises: modifying a string structure of the refresh token to include the global identifier and a replication group identifier, the replication group identifier identifying a group of accounts, the group of accounts including the first account and the second account; and replicating a token encryption key used to encrypt the refresh token.

Example 10 includes the method of any one or more of Examples 1-9, wherein the replicating of the authorization configuration of the first account comprises: replicating an integration object associated with the authorization configuration, the integration object providing an interface between the data platform and an authorization service corresponding to the authorization configuration; replicating a user in the authorization configuration; replicating a role in the authorization configuration; replicating an authorization consent in the authorization configuration; and linking the authorization consent with the integration object, the user, and the role.

Example 11 includes the method of any one or more of Examples 1-10, wherein replicating the authentication configuration of the first account comprises: replicating an integration object associated with the authentication configuration, the integration object providing an interface between the data platform and an authentication service associated with the authentication configuration, the replicating of the integration object resulting in a replicated integration object; and configuring the replicated integration object to include a global account uniform resource locator (URL).

Example 12 includes the method of any one or more of Examples 1-11, wherein: the identity management configuration comprises a System for Cross-domain Identity Management (SCIM) configuration; the authorization configuration comprises an Open Authorization (OAuth) configuration; and the authentication configuration corresponds to a security assertion markup language (SAML) single sign-on (SSO) configuration.

Example 13. A system comprising: one or more processors of a machine; and at least one memory storing instructions that, when executed by the one or more processors, cause the machine to perform operations implementing any one of example methods 1 to 12.

Example 14. A machine-readable storage device embodying instructions that, when executed by a machine, cause the machine to perform operations implementing any one of example methods 1 to 13.

Figure 9:
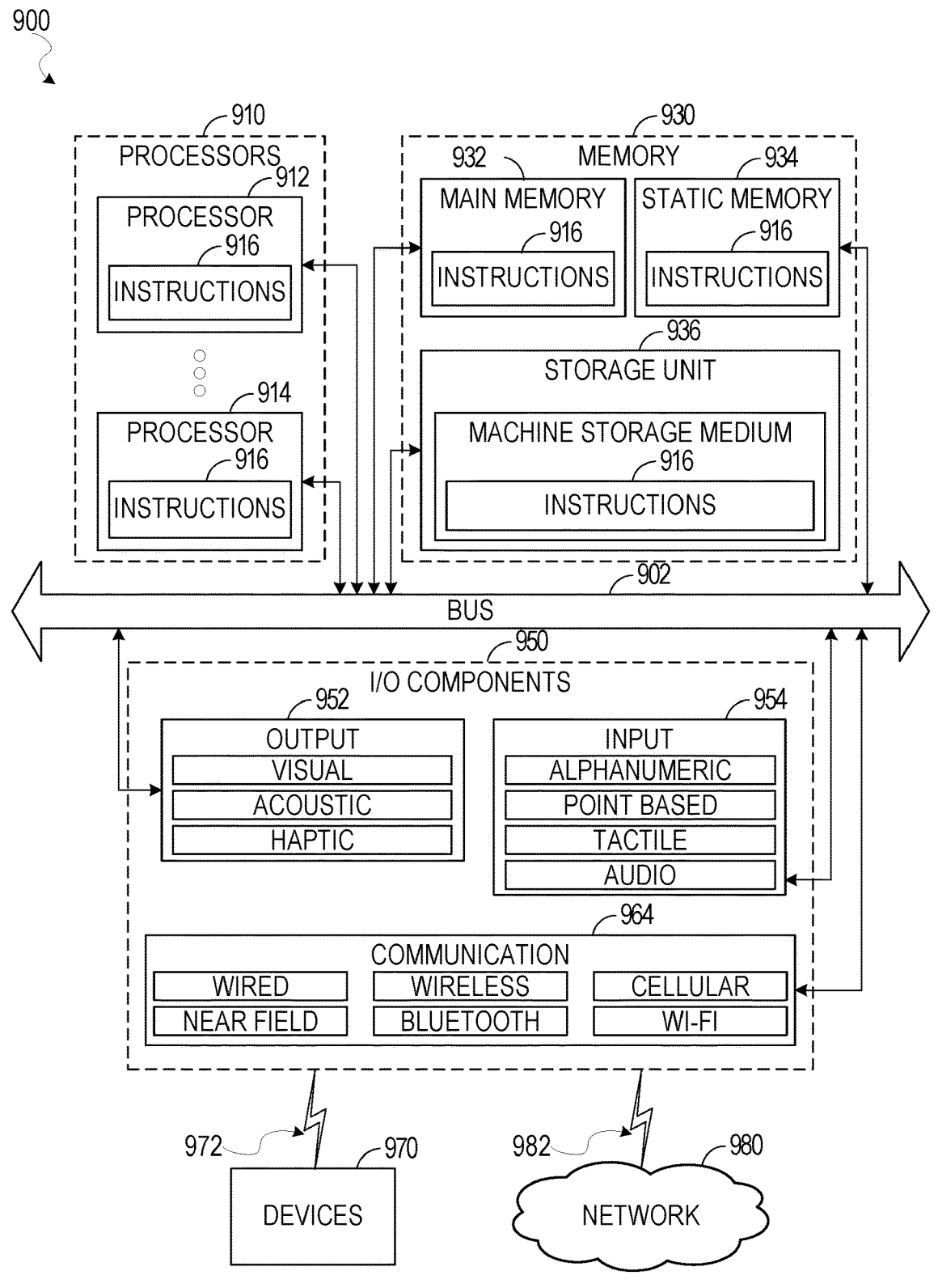
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the method 500. In this way, the instructions 916 transform a general, non-programmed machine into a particular machine 900 (e.g., the compute service manager 108, the execution platform 110, and the data storage devices 206) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108, the execution platform 110, and the devices 970 may include the data storage device 206 or any other computing device described herein as being in communication with the data platform 102 or the database storage 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A data platform comprising:

at least one hardware processor; and at least one memory storing instructions that cause the at least one hardware processor to perform operations comprising:

receiving a request to replicate a first account maintained by the data platform;

accessing, based on the request, account data associated with the first account, the account data comprising one or more security configurations for the first account;

in response to the request, replicating the first account using the account data, the replicating of the first account resulting in a second account, the replicating of the first account comprising automatically replicating the one or more security configurations for the first account to the second account, the replicating the one or more security configurations for the first account comprising replicating an authentication configuration to the second account, the replication of the authentication configuration comprising:

replicating an integration object associated with the authentication configuration, the integration object providing an interface between the data platform and an authentication service associated with the authentication configuration, the replicating of the integration object resulting in a replicated integration object; and enabling one or more users to access account resources of the first account upon failover to the second account by configuring the replicated integration object to include a global account uniform resource locator (URL) that provides access to the account resources.

2. The data platform of claim 1, wherein the replicating of the one or more security configurations further comprises configuring an access token associated with an identity management configuration for validation by the second account.

3. The data platform of claim 2, wherein configuring the access token associated with the identity management configuration comprises modifying a data structure of the access token to include a global identifier.

4. The data platform of claim 3, wherein the configuring of the access token further comprises:

modifying a string structure of the access token to include a replication group identifier, the replication group identifier identifying a group of accounts, the group of accounts including the first account and the second account;

replicating a token encryption key used to encrypt the access token; and modifying an identifier format associated with the access token to include the global identifier.

5. The data platform of claim 3, wherein the global identifier comprises a combination of a deployment identifier and an entity identifier, the deployment identifier identifying a deployment of the first account, the entity identifier identifying a customer entity corresponding to the first account.

6. The data platform of claim 1, wherein the replicating of the one or more security configurations further comprises replicating an identity management configuration, wherein the replicating of the identity management configuration comprises:

replicating a provisioner role in the identity management configuration, the provisioner role having associated permissions to provision new users and roles within the first account, the replicating of the provisioner role resulting in a replicated provisioner role having associated permissions to provision new users and roles within the second account;

replicating an integration object associated with the identity management configuration, the integration object providing an interface between the data platform and an identity management service corresponding to the identity management configuration; and connecting the provisioner role with the integration object.

7. The data platform of claim 1, wherein the replicating of the one or more security configurations further comprises configuring a refresh token associated with an authorization configuration for validation by the second account.

8. The data platform of claim 7, wherein configuring of the refresh token comprises modifying a data structure of the refresh token to include a global identifier, the global identifier comprising a combination of a deployment identifier and an entity identifier, the deployment identifier identifying a deployment of the first account, the entity identifier identifying a customer entity corresponding to the first account.

9. The data platform of claim 8, wherein the configuring of the refresh token further comprises:

modifying a string structure of the refresh token to include the global identifier and a replication group identifier, the replication group identifier identifying a group of accounts, the group of accounts including the first account and the second account; and replicating a token encryption key used to encrypt the refresh token.

10. The data platform of claim 8, wherein the replicating of the authorization configuration comprises:

replicating an integration object associated with the authorization configuration, the integration object providing an interface between the data platform and an authorization service corresponding to the authorization configuration;

replicating a user in the authorization configuration;

replicating a role in the authorization configuration;

replicating an authorization consent in the authorization configuration; and linking the authorization consent with the integration object, the user, and the role.

11. The data platform of claim 1, wherein the authentication configuration comprises a security assertion markup language (SAML) single sign-on (SSO) configuration.

12. A method comprising:

receiving a request to replicate a first account maintained by a data platform;

accessing, based on the request, account data associated with the first account, the account data comprising one or more security configurations for the first account;

in response to the request, replicating, by one or more hardware processors, the first account using the account data, the replicating of the first account resulting in a second account, the replicating of the first account comprising automatically replicating the one or more security configurations for the first account to the second account, the replicating the one or more security configurations for the first account comprising replicating an authentication configuration to the second account, the replication of the authentication configuration comprising:

replicating an integration object associated with the authentication configuration, the integration object providing an interface between the data platform and an authentication service associated with the authentication configuration, the replicating of the integration object resulting in a replicated integration object; and enabling one or more users to access account resources of the first account upon failover to the second account by configuring the replicated integration object to include a global account uniform resource locator (URL) that provides access to the account resources.

13. The method of claim 12, wherein the replicating of the one or more security configurations further comprises configuring an access token associated with an identity management configuration for validation by the second account, wherein configuring the access token associated with the identity management configuration comprises modifying a data structure of the access token to include a global identifier.

14. The method of claim 13, wherein the configuring of the access token further comprises:

modifying a string structure of the access token to include a replication group identifier, the replication group identifier identifying a group of accounts, the group of accounts including the first account and the second account;

replicating a token encryption key used to encrypt the access token; and modifying an identifier format associated with the access token to include the global identifier.

15. The method of claim 12, wherein the replicating of the one or more security configurations further comprises replicating an identity management configuration, wherein the replicating of the identity management configuration comprises:

replicating a provisioner role in the identity management configuration, the provisioner role having associated permissions to provision new users and roles within the first account, the replicating of the provisioner role resulting in a replicated provisioner role having associated permissions to provision new users and roles within the second account;

replicating an integration object associated with the identity management configuration, the integration object providing an interface between the data platform and an identity management service corresponding to the identity management configuration; and connecting the provisioner role with the integration object.

16. The method of claim 12, wherein the replicating of the one or more security configurations further comprises configuring a refresh token associated with an authorization configuration for validation by the second account.

17. The method of claim 16, wherein configuring of the refresh token comprises modifying a data structure of the refresh token to include a global identifier, the global identifier comprising a combination of a deployment identifier and an entity identifier, the deployment identifier identifying a deployment of the first account, the entity identifier identifying a customer entity corresponding to the first account.

18. The method of claim 17, wherein the replicating of the authorization configuration comprises:

replicating an integration object associated with the authorization configuration, the integration object providing an interface between the data platform and an authorization service corresponding to the authorization configuration;

replicating a user in the authorization configuration;

replicating a role in the authorization configuration;

replicating an authorization consent in the authorization configuration; and linking the authorization consent with the integration object, the user, and the role.

19. The method of claim 12, wherein the authentication configuration comprises a security assertion markup language (SAML) single sign-on (SSO) configuration.

20. A computer-storage medium comprising instructions that, when executed by one or more processors of a machine, configure the machine to perform operations comprising:

receiving a request to replicate a first account maintained by a data platform;

accessing, based on the request, account data associated with the first account, the account data comprising one or more security configurations for the first account;

in response to the request, replicating, by one or more hardware processors, the first account using the account data, the replicating of the first account resulting in a second account, the replicating of the first account comprising automatically replicating the one or more security configurations for the first account to the second account, the replicating the one or more security configurations for the first account comprising replicating an authentication configuration to the second account, the replication of the authentication configuration comprising:

replicating an integration object associated with the authentication configuration, the integration object providing an interface between the data platform and an authentication service associated with the authentication configuration, the replicating of the integration object resulting in a replicated integration object; and enabling one or more users to access account resources of the first account upon failover to the second account by configuring the replicated integration object to include a global account uniform resource locator (URL) that provides access to the account resources.

* * * * *